July 16, 1946.  M. FLATLAND  2,404,129
ELECTRICAL WINDING
Filed Sept. 20, 1943

INVENTOR.
MARTIN FLATLAND.
BY
ATTORNEY.

Patented July 16, 1946

2,404,129

UNITED STATES PATENT OFFICE 2,404,129

ELECTRICAL WINDING

Martin Flatland, San Francisco, Calif.

Application September 20, 1943, Serial No. 503,162

4 Claims. (Cl. 171—206)

This invention relates to improvements in electrical windings and more particularly to the means and methods of winding the stators and rotors of electric motors and the like.

Among the objects of the invention is to facilitate the coiling and placement of electric wires around the cores or poles for the purpose of generating polarized magnetic fields.

Another object is to save time and material in the winding of new coils and in removing and replacing the same when burned out.

A further object is to guard against injury to the insulation of the wires while being placed around the cores or poles in segmental motor stators, rotors, transformers and the like.

Other objects and advantages will appear as the description proceeds.

In this specification and the accompanying drawing the invention is disclosed in its preferred form. But it is to be understood that it is not limited to this form, because it may be embodied in modifications within the spirit of the invention as defined in the claims following the description.

Heretofore it has been the practice in this art to wind a continuous length of insulated wire around the interspaced cores of a motor, for instance.

This invention departs from that method by forming a loose cable or cord of plural lengths of wire, then reeving the whole cord around the core segments in the desired sequence, then joining the exposed ends of the separate lengths of wire to form one continuous wire of the combined lengths forming the cord.

The electromotive force is the same in each instance, but there is a great saving in time and material in the increase efficiency of the present invention.

Figure 1:
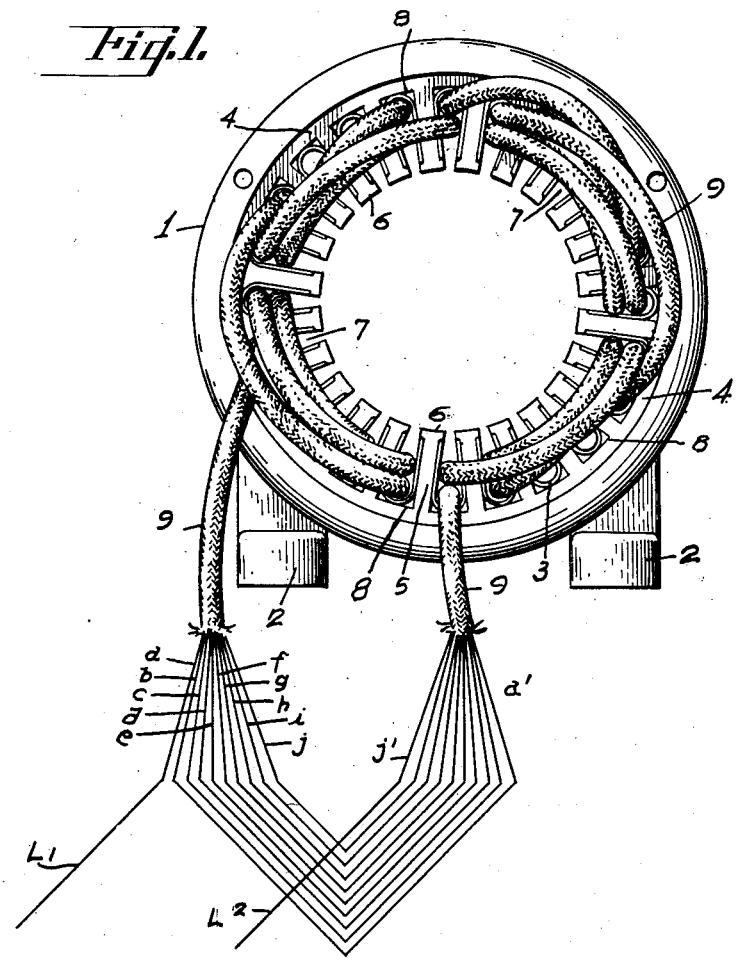
Fig. 1 is an end elevation of the stator of a conventional A. C. electric motor in the process of being wound in accordance with this invention, the rotor and bearings being omitted.

In detail the construction illustrated in the drawing, referring first to Fig. 1, comprises the cylindrical body 1 of the motor, having the base 2, the bearing brackets and rotor being omitted for clarity.

The magnetic field elements of the stator consist of the cylindrical ring 4 composed of lamination of sheet iron, die punched to form the series of segmental cores 5 having the integral interspaced heads 6 with the axially alined slots 7 therebetween. This invention is applicable to a variety of electro-magnetic mechanisms and is not limited by the illustrations chosen for this disclosure.

Heretofore it has been the practice to lay a single insulated wire through the slots 7 and wind the continuous wire about one of the cores 5 to form an encircled coil of the desired number of turns. Then choose the next core 5 and repeat the operation seriatim until all the cores 5 are thus encircled, the accumulating coils of single wires in the cord filling the spaces 8, between the cores. It is usual to line the spaces 8 between the cores with fibreboard or other forms of insulating material 3 to protect the insulation of the wire from injury against the laminated surface of the cores 5 that is rough and often uneven and a great hazard to the insulation surrounding the wire. Sufficient insulation may be scraped from the wire to cause short circuits in the coils without attracting the attention of the operator until trouble develops in the motor in use.

The length of wire for any given stator being known: In the practice of this invention this length is divided into the desired multiples for that length, say ten lengths as in Fig. 1

$$a.b.c.d.e.f.g.h.i.j$$

This bundle of separate lengths is then assembled within the woven sleeving 9 for repair work. For mass production the multiples of wire can be woven within the sleeving by whipcord machinery, then cut to length as required.

All the lengths of the separate wires in the sleeving are then reeved back and forth through the spaces 8, forming coils around the separate cores 5. If the spaces 8 are free from burrs and protruding edges liable to injure the insulated wire, the usual insulating fiberboard above mentioned can be reduced or omitted. The sleeving 9 provides sufficient protection and insulation between the core 5 and the surrounding coils, when the winding is completed and saturated with varnish or other protective binders used for that purpose.

When the winding is completed, the opposite ends of the cable are in proximity as in Fig. 1. One end of any continuity circuit tester is attached to the lead in wire end L', which may be any of the twenty protruding ends, the other end of this length, having been determined by test, is then attached by fusing to any other protruding end at random which then becomes $a^1$. This testing procedure continues until all the protruding ends are connected, except j1, which becomes the lead out line L2 of a continuous wire encircling the cores 5 forming the segmented stator or rotor, from L1 to L2.

In addition to the facility with which the cord can be reeved through the spaces 8, are the additional advantages that eliminating some or all the fiberboard and other extraneous insulation in the spaces 8, leaves additional space therein for more wire or better ventilation. Also the gaps 7 can be made narrower, adding to the efficiency of the motor, minimizing the liability to short-circuiting and burning out of the windings. The cord sleeving 9 when varnished contributes to the long life and good appearance of the motor windings in the finished product.

Further advantages of reeving the cord through the spaces 8 from end to end, instead of forcing the individual wires down through the slots 7, are the saving of time, protection of the insulation on the wires, preventing the crossing of the wires in the coils that often breaks the insulation when the wires are tamped down into the slots 7 as heretofore.

In winding single or plural phased motors the procedure is conventional, that is, after one core 5 is wound the next one or two cores can be skipped until they are successively wound as the cord is carried around the circle of the stator, to produce one or two or three phase effects, as desired. Other applications of the invention will be apparent to those skilled in this art.

Figure 2:
Fig. 2 is a detail illustrating the manner of assembling the cord.

The cord described is easily fabricated by assembling a bunch of parallel wires, such as X in Fig. 2, then attaching the ends of these wires to the end of the stiff bodkin wire Y that is passed through the sleeving 9 from end to end. The bundle of wires X is then pulled through the sleeving. It is preferable that the sleeving be longer than the wires, leaving the excess of sleeving Z projecting beyond the wire ends to facilitate reeving the cord through the spaces 8. When enamel insulated wires are used, the enamel is protected from injury by the sleeving during the reeving operation.

Having thus described this invention what is claimed and desired to secure by Letters Patent is:

1. The method of winding magnetic field cores, consisting in assembling a plurality of wires in compact cable formation; then reeving an end of said cable between and around said cores and then joining the ends of said wires to form a continuous wire between its free ends.

2. The method of winding magnetic cores, consisting in forming a cable of independent lengths of wire; then longitudinally reeving an end of said cable between and around said cores; then joining the ends of said independent wires in their proper sequence to form a continuous wire between its terminal ends.

3. The method of winding interspaced magnetic cores consisting in longitudinally reeving the unconnected ends of a plurality of wires simultaneously through the spaces between and around said cores seriatim; then joining the intermediate ends of said wires and forming a continuous single wire.

4. The method of winding a motor stator having interspaced cores with transverse heads overhanging said spaces between the cores, consisting in longitudinally passing the ends of a plurality of wires simultaneously through the spaces between said cores beneath said heads; then joining the intermediate ends of said lengths of wire and forming a continuous single wire.

MARTIN FLATLAND.